United States Patent
Shinohara et al.

(10) Patent No.: US 7,493,571 B2
(45) Date of Patent: Feb. 17, 2009

(54) ELECTRONIC APPARATUS WITH DISPLAY UNIT, INFORMATION-PROCESSING METHOD, AND COMPUTER PRODUCT

(75) Inventors: Michinari Shinohara, Kanagawa (JP); Hiroshi Morikawa, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 424 days.

(21) Appl. No.: 11/082,781

(22) Filed: Mar. 18, 2005

(65) Prior Publication Data
US 2005/0216862 A1    Sep. 29, 2005

(30) Foreign Application Priority Data
Mar. 19, 2004  (JP)  ............................. 2004-080795
Feb. 15, 2005  (JP)  ............................. 2005-038267

(51) Int. Cl.
  *G06F 3/048*  (2006.01)
(52) U.S. Cl. ..................... 715/835; 715/838; 715/815; 715/810; 715/812
(58) Field of Classification Search .................. None
  See application file for complete search history.

(56) References Cited

U.S. PATENT DOCUMENTS

| 5,564,004 | A | * | 10/1996 | Grossman et al. ............ 715/835 |
| 5,565,888 | A | * | 10/1996 | Selker ......................... 715/823 |
| 5,706,457 | A | * | 1/1998 | Dwyer et al. ................. 715/835 |
| 5,923,737 | A | | 7/1999 | Weishut et al. |
| 5,977,976 | A | * | 11/1999 | Maeda ......................... 715/841 |
| 6,091,450 | A | | 7/2000 | Hirasawa |
| 6,118,888 | A | * | 9/2000 | Chino et al. ................. 382/118 |
| 6,169,854 | B1 | * | 1/2001 | Hasegawa et al. ............. 396/56 |
| 6,215,482 | B1 | * | 4/2001 | Hwang ........................ 711/105 |
| 6,327,001 | B1 | * | 12/2001 | Yamagishi .................. 348/552 |
| 6,417,869 | B1 | * | 7/2002 | Do ............................. 715/718 |
| 6,453,078 | B2 | * | 9/2002 | Bubie et al. ................. 382/305 |
| 6,600,499 | B1 | | 7/2003 | MacPhail |
| 7,036,080 | B1 | * | 4/2006 | James et al. ................. 715/728 |

(Continued)

FOREIGN PATENT DOCUMENTS

EP    1 246 434 A1    10/2002

(Continued)

OTHER PUBLICATIONS

Fixya Technical Support; "Online User Manual and Guide for Sony Cyber-Shot DSCP92 Digital Camera"; Copyright Date: 2003; http://www.fixya.com/support/p325603-sony_cyber_shot_dsc_p92_digital_camera/manual-15724.*

*Primary Examiner*—Doug Hutton
*Assistant Examiner*—Soumya Dasgupta
(74) *Attorney, Agent, or Firm*—Oblon, Spivak, McClelland, Maier & Neustadt, P.C.

(57) ABSTRACT

An electronic apparatus with a display unit that can display icons indicating an apparatus state or an operating condition based on an on-screen display function includes an apparatus-condition detecting unit that detects a change of the apparatus state or a change of a setting of the operating condition; an icon assigning unit that assigns an icon indicating the apparatus state or the operating condition for which the change is detected by the apparatus-condition detecting unit; and an on-screen-display controller that displays the icon assigned in a shape different from the icon before being assigned.

24 Claims, 14 Drawing Sheets

U.S. PATENT DOCUMENTS

| | | | |
|---|---|---|---|
| 7,044,459 B2* | 5/2006 | Watson | 267/257 |
| 7,155,676 B2* | 12/2006 | Land et al. | 715/731 |
| 7,280,238 B2 | 10/2007 | Akiyoshi | |
| 2003/0164855 A1* | 9/2003 | Grant et al. | 345/763 |
| 2004/0119851 A1* | 6/2004 | Kaku | 348/239 |
| 2006/0029381 A1 | 2/2006 | Onozawa | |
| 2007/0285702 A1 | 12/2007 | Akiyoshi | |

FOREIGN PATENT DOCUMENTS

| | | |
|---|---|---|
| EP | 1 315 369 A1 | 5/2003 |
| JP | 11-146234 | 5/1999 |
| JP | 2001-67163 | 3/2001 |
| JP | 2001-211354 | 8/2001 |
| JP | 2002-223403 | 8/2002 |
| JP | 2002-290784 | 10/2002 |
| JP | 2003-229986 | 8/2003 |
| JP | 2003-244354 | 8/2003 |
| JP | 2004-21554 | 1/2004 |
| JP | 2004-61762 | 2/2004 |
| JP | 2006-47602 | 2/2006 |
| JP | 2006-86758 | 3/2006 |

* cited by examiner

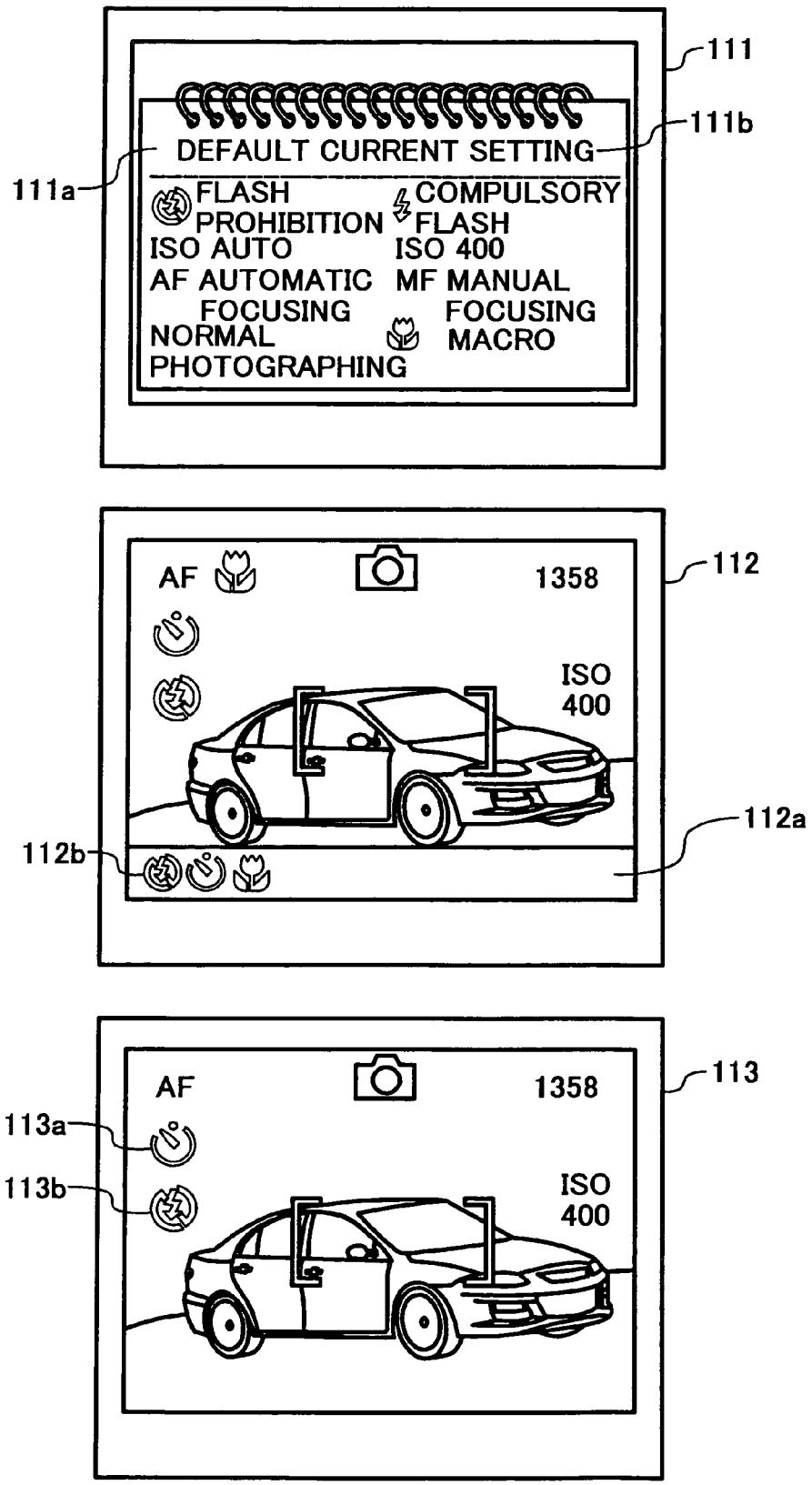

ELECTRONIC APPARATUS WITH DISPLAY UNIT, INFORMATION-PROCESSING METHOD, AND COMPUTER PRODUCT

CROSS-REFERENCE TO RELATED APPLICATIONS

The present document incorporates by reference the entire contents of Japanese priority document, 2004-080795 filed in Japan on Mar. 19, 2004 and 2005-038267 filed in Japan on Feb. 15, 2005.

BACKGROUND OF THE INVENTION

1) Field of the Invention

The present invention relates to an electronic apparatus with a display unit, an information-processing method, and a computer product.

2) Description of the Related Art

Recently, digital still cameras, portable telephones equipped with a digital camera, and the like are in widespread use as a media of image information. These apparatuses can provide various functions by handling the image information as electronic data.

An on-screen display (OSD) function is one of those functions, so far used as a user interface. According to the OSD function, icons that indicate device states and operating conditions, characters, or the like are displayed in superimposition on a main image on a display screen. Based on these icons and the like that indicate a set operation mode of the device and give guidance to a device user, the user can interact with the device.

For example, Japanese Patent Application Laid-Open No. H11-146234 discloses a conventional example of a device having the OSD function. The invention described in this publication relates to a digital camera. The digital camera has a mode of reproducing and displaying image data stored in a memory card, and a mode of displaying a photographed image through the digital camera. Image data and character data showing a counter, a date, a photographing condition, and the like are combined, and the combined data are displayed on a screen of a liquid crystal display device (LCD) as a display unit. The invention disclosed in this publication has an object of securing a normal display by avoiding a difference of sizes between character data displayed on the screen attributable to different scan speeds between the display modes.

Digital cameras, portable telephones, and the like having relatively small displays have the OSD function which is used as the user interface. Further, in recent years, these devices have various functions based on the progress of advanced multiple functions. In this situation, many icons are displayed on the screen of a limited size; therefore individual icons need to be small.

When the icons are small, characters that are set on the screen have poor visibility because of garbled display. The user cannot confirm the own setting, and may make an erroneous setting of functions. When display sizes of the characters are increased to avoid the poor visibility, these characters may hinder the display of base image data. Further, all the icons cannot be displayed because of the large size.

SUMMARY OF THE INVENTION

It is an object of the present invention to solve at least the above problems in the conventional technology.

An electronic apparatus with a display unit according to one aspect of the present invention, which can display icons indicating an apparatus state or an operating condition based on an on-screen display function, includes an apparatus-condition detecting unit that detects a change of the apparatus state or a change of a setting of the operating condition; an icon assigning unit that assigns an icon indicating the apparatus state or the operating condition for which the change is detected by the apparatus-condition detecting unit; and an on-screen-display controller that displays the icon assigned in a shape different from the icon before being assigned.

An information-processing method according to another aspect of the present invention, which is for controlling an electronic apparatus with a display unit that can display icons indicating an apparatus state or an operating condition based on an on-screen display function, includes determining a change of the apparatus state or a change of a setting of the operating condition; assigning an icon indicating the apparatus state or the operating condition for which the change is detected at the determining; and displaying the icon assigned in a shape different from the icon before being assigned based on the on-screen display function.

A computer-readable recording medium according to still another aspect of the present invention stores a computer program that makes a computer execute the above information-processing method according to the present invention.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 11 is a schematic for illustrating an example of a display of icons when photographing conditions are set differently from default conditions.

DETAILED DESCRIPTION

Exemplary embodiments of the present invention will be explained in detail with reference to the accompanying drawings. In the following embodiment, a digital camera is explained as the electronic apparatus. The present invention can be also applied to an electronic apparatus other than the digital camera having a compact display as a user interface in which a set operating mode and the like can be determined according to an icon display using an OSD function.

Figure 1:
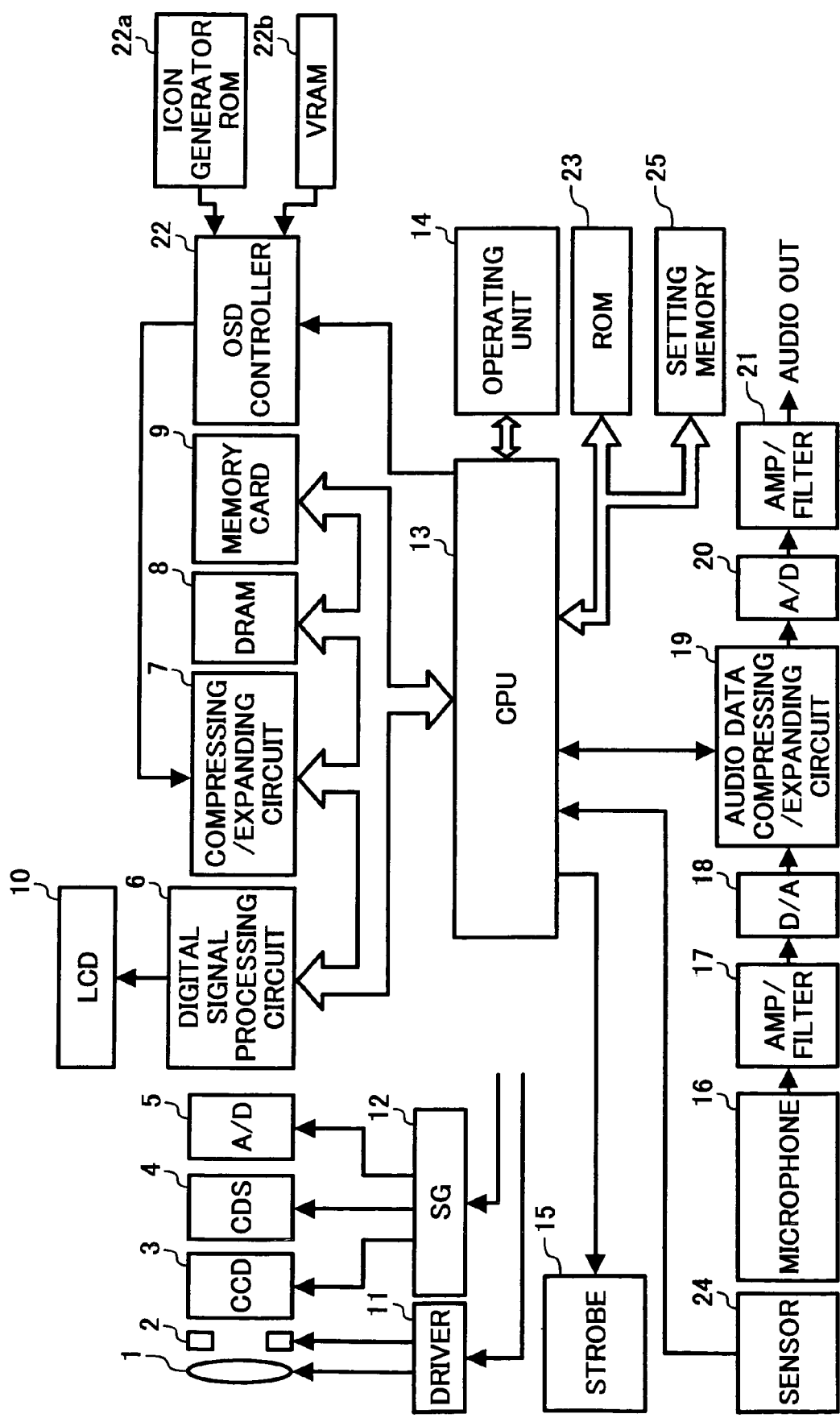
FIG. 1 is a block diagram of a basic configuration of a digital camera according to an embodiment of the present invention.

FIG. 1 is a block diagram of a basic configuration of the digital camera according to the present embodiment. The digital camera shown in FIG. 1 includes a lens 1, a mechanism 2 including an automatic focusing mechanism, a charge-coupled device (CCD) 3, a correlation double sampling (CDS) circuit 4, an analog/digital (A/D) converter 5, a digital signal processing circuit 6, a compressing/expanding circuit 7, a dynamic random access memory (DRAM) 8, a memory card 9, an LCD 10, a driver 11, a synchronous generator (SG) 12, a central processing unit (CPU) 13, an operating unit 14, a strobe light 15, a microphone 16, an amplifier/filter (AMP/FILTER) 17, a digital/analog (D/A) converter 18, an audio data compressing/expanding circuit 19, an analog/digital (A/D) converter 20, an (AMP/FILTER) 21, and an on-screen-display controller 22.

A lens unit includes the lens 1, the mechanism 2 having an automatic focusing (AF) unit, a diaphragm, and a filtering unit. The CCD 3 converts an image input via the lens unit into an electric signal (analog image data). The CDS circuit 4 decreases noise of a CCD imaging device. The A/D converter 5 converts the analog image data input from the CCD 3 via the CDS circuit 4 into digital image data. In other words, a signal output from the CCD 3 passes through the CDS circuit 4, and the A/D converter 5 converts this signal into a digital signal at an optimum sampling frequency.

The digital signal processor 6 divides the image data input from the A/D converter 5 into color difference data and luminance data, and processes the data to correct and compress/expand the image.

The image compressing/expanding circuit 7 carries out an orthogonal conversion/inverse orthogonal conversion as one process of the image compression/expansion based on the JPEG (Joint Photographic Experts Group), and a Huffman coding/Huffman decoding as a process of the image compression/expansion based on the JPEG.

On the other hand, a sound/electric signal converting device like a microphone 16 converts sound into an electric signal, and this signal becomes audio data. The AMP/FILTER 17 amplifies this audio data, and cuts off the amplified audio data into a necessary band. The D/A converter 18 converts the audio data into digital audio data at a sampling frequency of two or more times of a predetermined band. The data compressing/expanding unit 19 compresses and encodes the digital audio data.

The DRAM 8 temporarily stores the compressed image data. The compressed image data is stored as an image data file and the compressed audio data is recorded as an audio data file, in the memory card 9.

The LCD 10 directly displays the image data photographed by the CCD 3, and displays an image corresponding to the image data recorded in the memory card 9. The LCD 10 also displays a set state of the digital still camera, such as a set mode, and an error, using the OSD function described in detail later.

The CPU 13 controls the operation of each unit of the digital still camera following a control program stored in the ROM 23, according to an instruction from the operating unit 14 or an external operation instruction based on a remote control or the like (not shown). Specifically, the CPU 13 issues a control command concerning the control of the recording of the image data and the control of the reproduction of the image data. The CPU 13 also issues a control command concerning the control of the display of icons in the on-screen-display controller 22, following the OSD control program stored in the ROM 23.

The operating unit 14 has operation buttons and the like to externally carry out a selection of a function, a photographing instruction, and various other settings. The on-screen-display controller 22 generates icon data, and outputs the generated icon data to the digital signal processing circuit 6 at timing of a dot clock in a predetermined cycle. The icon data includes character display data of a counter, a time, and a date, symbol data such as a photographing condition, and the like.

The digital camera has a reproduction mode of displaying in the LCD 10 image data which is photographed by the CCD 3 and is temporarily stored in the memory card 9, and a through image mode of directly displaying in the LDC 10 image data which is photographed by the CCD 3.

The recording of image data obtained by the digital camera is explained next. First, the CCD 3 converts an image picked up through the lens 1 into an electric signal (analog image data). The analog image data passes through the CDS 4, and is input to the A/D converter 5. The A/D converter 5 converts the analog image data into digital image data. The digital signal processing circuit 6 signal-processes the converted digital image data, and the processed image data is stored in the DRAM 8 via a CPU bus. The digital image data stored in the DRAM 8 is input to the compressing/expanding circuit 7 via the CPU bus, is compressed, and the compressed data is stored in the DRAM 8 again. After the digital image data is compressed, the CPU 13 records the compressed image data stored in the DRAM 8 as an image data file in a predetermined format, into the memory card 9, via the CPU bus.

In the reproduction mode, the image data stored in the memory card 9 is reproduced as follows. When a user operates the operating unit 14 to assign an image data file stored in the memory card 9 to reproduce this image data, the compressed image data in the assigned image data file is read out, and is stored in the DRAM 8. The image data stored in the DRAM 8 is input to the compressing/expanding circuit 7 via the CPU bus, and is expanded. The expanded image data is stored in the DRAM 8 again. The expanded image data stored in the DRAM 8 is input to the digital signal processing circuit 6 via the CPU bus, and is converted into a video signal to be displayed in the LCD 10.

In the through image mode of directly displaying image data of a photographed image, the CCD 3 converts the image picked up through the lens 1 into an electric signal (analog image data). The analog image data passes through the CDS 4, and is input to the A/D converter 5. The A/D converter 5 converts the analog image data into digital image data. The digital signal processing circuit 6 signal-processes the converted digital image data, and the processed image data is once stored in the DRAM 8. The image data is converted into a video signal to be displayed in the LCD 10.

The on-screen-display controller 22 includes a command decoder that decodes a command input from the CPU 13, a video RAM (VRAM) 22b in which icon data read from an icon data generator read-only memory (ROM) 22a is extracted, the icon data generator ROM 22a that outputs icon data corresponding to a command sent out from the CPU 13, an oscillating circuit that outputs a dot clock to an output controller, and an output controller that outputs icon data extracted in the video RAM 22b to the digital signal processing circuit 6 at timing of the dot clock input from the oscillating circuit, by synchronizing the icon data with a vertical synchronization signal and a horizontal synchronization signal.

When a setting is changed based on an input operation from the operating unit 14, the on-screen-display controller 22 receives reference result information from the CPU 13 after the CPU 13 refers to a setting memory 23 held by the CPU 13, and the on-screen-display controller 22 selects an item of which setting is changed.

The on-screen-display controller 22 inputs command data from the CPU 13. The on-screen-display controller 22 reads icon data indicated by a decoded command, from the icon data generator ROM 22*a*, and extracts the icon data in the video RAM 22*b*. The output controller outputs the extracted icon data to the digital signal processing circuit 6 at timing of the dot clock input from the oscillating circuit, by synchronizing the icon data with the vertical synchronization signal and the horizontal synchronization signal.

The digital signal processing circuit 6 combines a through image to be reproduced or a reproduced image, with icon data input from the on-screen-display controller 22. The digital signal processing circuit 6 carries out a signal conversion of the combined data so that it can be displayed, and displays the combined image on the screen of the LCD 10.

The sensor 24 is an infrared sensor, for example. When an operator comes close to the digital camera to be able to operate the camera, the infrared sensor detects the approach of the operator. When the infrared sensor detects the operator, a detected signal is sent to the CPU 13 to make a setting so that the on-screen-display controller 22 can execute the OSD control function. For the sensor 24, the following sensors can be also used, in addition to the infrared sensor, a distance sensor that measures a distance between the camera and a human body, a contact sensor that detects a contact of a human body on the camera, an optical sensor that detects using light, an eyeball detection sensor that detects an eyeball, an eyeshot detection sensor that detects an eyeshot of a person, and a pressure sensor that detects a pressure when a person holds the digital camera. The sensor 24 automatically detects that the operator is at a near position, and the CPU 13 starts the OSD control function using the OSD control program.

The LCD 10 is a monitor that is generally disposed at the back of the digital camera, and is used to display an image to be photographed or display a photographed image.

The LCD 10 is not limited to the monitor that is generally disposed at the back of the digital camera, but can be an electronic view finder (EVF). The LCD 10 can be also disposed within the optical finder to make a display. While the LCD is applied to the digital camera according to the present embodiment, the LCD can be also used for an icon display unit of the optical finder within a general silver salt film camera.

The OSD function used as the user interface in the digital camera having the above configuration is further explained.

According to the present embodiment, an operation mode set by a user can be determined based on the display of icons using the OSD function. In the present embodiment, it is assumed that when a user does not set an operating condition such as a photographing condition, the operating condition is set in an automatic mode of automatically setting a photographing condition or is determined by default. When the setting of the automatic mode determined in advance in the device is changed by a user operation, the user can determine whether the changed setting is correct. In other words, in substantially all cases, the digital camera can carry out a proper photographing in the automatic mode or in the default setting. When the setting is to be changed, this means that the user intentionally changes the setting. Since the change of the setting has a risk of failure in photographing, the user needs to determine whether the changed setting is correct.

Figure 2:
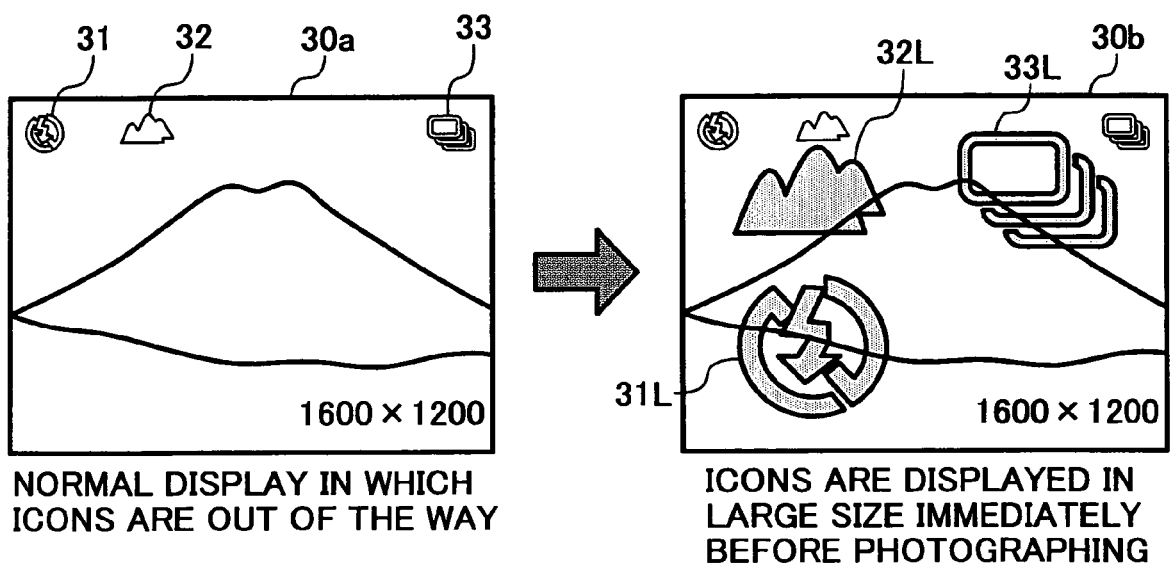
FIG. 2 is a schematic of icons enlarged on a liquid crystal display (LCD) based on an OSD function of the digital camera according to the present embodiment.

FIG. 2 is a schematic of icons enlarged on the LCD 10 based on an OSD function of the digital camera according to the present embodiment. A screen 30*a* shows a normal display where the icons are not a hindrance, and a screen 30*b* shows the icons that are displayed in an enlarged size immediately before photographing an image. The display of the icons using the OSD function that enables the user to determine about the user setting is carried out simultaneously with the user setting. Conventionally, as shown on the screen 30*a* shown in FIG. 2, the icons are displayed at the edge of the screen by taking into account a size and a position that do not hinder the photographing image (a background image) of the camera that becomes a base of the display screen. Three icons shown on the screen 30*a* shown in FIG. 2 indicate photographing conditions of which setting is changed from a default setting by a user operation. In this example, these icons show a flash prohibition 31, a distant view 32, and a serial shot 33. Therefore, when the display is compact, it is difficult to recognize the icons, and the user may not realize an erroneous setting of photographing conditions.

To overcome this difficulty, according to the present embodiment, in displaying the setting conditions changed by the user operation, as shown by the screen 30*b* shown in FIG. 2, the size of the icons shown on the screen 30*a* shown in FIG. 2 is increased to about two to four times to obtain icons 31L, 32L, and 33L to be superimposed on a major part of the background image (the image to be photographed by the camera). With this arrangement, the user can sufficiently confirm the setting contents, thereby solving the above problem, and improving visibility.

Based on the input operation of the operating unit 14, the CPU 13 stores the setting of the photographing (operation) conditions changed by the user operation into the setting memory 25 that stores the control data. The setting memory 25 holds the changed setting until when the power source is turned off or until when the setting is further changed at the next input operation. Therefore, in carrying out an enlarged display of the icons, the CPU 13 checks the setting memory 25 to determine whether there is a user setting. When the CPU 13 determines that data is present in the setting memory 25, the CPU 13 specifies the icons to be displayed in a large size based on the setting contents, and transmits a command to the on-screen-display controller 22 to control the display. Upon receiving this command, the on-screen-display controller 22 takes out the icon data to be used for the indicated enlarged display, from the ROM, and outputs the icon data to the digital signal processing circuit 6. Required data for enlarged display can be prepared from the icon data used for a normal display based on calculation.

The enlarged display of the icons is useful to confirm whether the setting operation is correct. This setting is maintained until the power source is turned off as described above. Therefore, it is necessary to confirm the setting each time of photographing an image even when the setting is not carried out. The enlarged icons are superimposed on a major part of the image to be photographed by the camera as the base of the display screen, as shown on the screen 30*b* shown in FIG. 2. Therefore, when icons that completely hide the photographed image are used, it is desirable to use the control of ending the enlarged display of the icons after making a determination based on the enlarged icons, thereby returning the display of the icons to the normal display state as shown on a screen 35b from the state of the enlarged display shown on a screen 35a shown in FIG. 4.

A first method of controlling the starting or the ending of the state of the enlarged display of the icons is based on an instruction by the user operation. For example, the user starts the enlarged display of the icons by half depressing a release button, and then returns the button from the half-depressed state to the original state, or depresses another hard key, thereby ending the enlarged display of the icons.

A second method of controlling the starting or the ending of the state of the enlarged display of the icons is as follows. When a photographing condition is ready, the operator depresses the release (shutter) button. The CPU 13 determines that the photographing is ready, and starts the enlarged display of the icons. After a lapse of a predetermined time, the device automatically ends the enlarged display.

The first and the second methods can be used in combination. In other words, either the starting or the ending of the enlarged display is carried out automatically or is carried out by the user operation. Alternatively, the automatic control and the user operation can be used in combination.

The enlarged icons are superimposed on a major part of the image to be photographed by the camera as the base of the display screen, as shown on the screen 30b shown in FIG. 2. Therefore, when the icons completely hide the image to be photographed, it is inconvenient for the user to determine an image construction of the object.

To avoid this inconvenience, the enlarged icons are displayed as a semitransparent image. In using a method of displaying a semitransparent image, the user can also employ a system in which the user can select a semitransparent or an opaque display. For example, the icons are used for the operation at the display time or for the user setting carried out in advance. The method of displaying the enlarged icons as a semitransparent image is effective because the image to be photographed is visible through the semitransparent image when the user cannot end the enlarged display of the icons, that is, when the device automatically ends the enlarged display. The semitransparent image can be superimposed on the base image on the display screen based on a known method.

The photographing operation by the camera can be independent of the operation of enlarging the icons. Based on the same concept as the semitransparent display of the enlarged icons, it is necessary to avoid restricting the photographing operation as much as possible while allowing the photographing operation with a display of enlarged icons. Therefore, while the icons are displayed in a large size, the camera is set to a photographable state. In other words, while the icons are displayed in a large size, the user can photograph the image when the user depresses the release (shutter) button. By carrying out the control following these conditions, the user can perform a proper photographing without missing a shutter chance.

The enlarged display of the icons can be started when the power source of the digital camera is turned on. With this arrangement, the user can visually confirm a change of the setting simultaneously with the turning on of the power source for photographing.

The icons corresponding to the changed setting can be displayed after a lapse of a certain time since the user turns on the power source of the digital camera. This is suitable because, in many cases, the user does not start the photographing operation immediately after the power source is turned on.

The icons corresponding to the changed setting can be displayed after a lapse of a first predetermined time since the user turns on the power source of the digital camera, and the icons can be returned to a normal mode after a lapse of a second predetermined time. When the power source is turned on, the user visually confirms the changed setting after a lapse of a certain time. After ending the visual confirmation in a certain time, the user carries out the normal photographing. Therefore, it is very convenient when the enlarged display of the icons is returned to the normal display by the time when the photographing operation is carried out.

In displaying the icons corresponding to a changed setting in the digital camera, the enlarged icons can be displayed at timing when the object is in focus in a half-depressed state of the shutter button. When the enlarged icons are displayed at the timing when the object is in focus in a half-depressed state of the shutter button of the digital camera, the user is not hindered by the enlarged display from looking at the object screen until immediately before the user starts half depressing the shutter button. The enlarged icons are displayed when the user starts half depressing the shutter button. Therefore, the user can secure visibility of confirming the object, and visibility of confirming the icons corresponding to the changed setting.

The operating unit 14 can have an input button which the operator can depress. When the operator depresses the input button, the operating unit 14 transmits an input signal to the on-screen-display controller 22. Upon reception of the input signal, the on-screen-display controller 22 can control starting, ending, and suspending the enlarged display of the icons. This arrangement can improve the degree of freedom of the operator.

An embodiment of an icon display control using the OSD function that enables the user to confirm the user setting is explained next. In the following embodiment, a display starting and a display ending are controlled either automatically or by the user operation.

Figure 3:
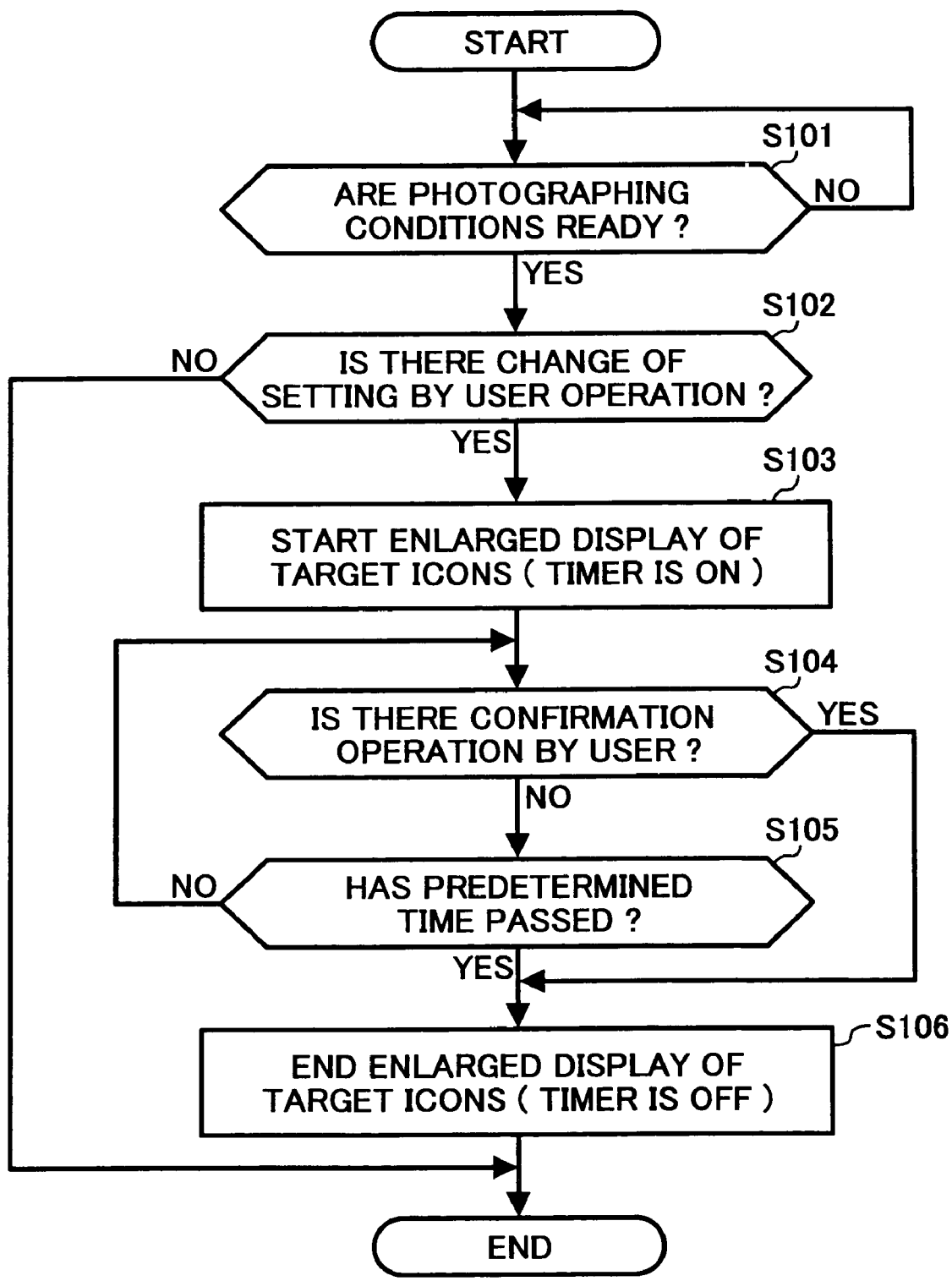
FIG. 3 is a flowchart of a process procedure for an icon display control according to the present embodiment.

FIG. 3 is a flowchart of a process procedure for an icon display control according to the present embodiment. The operation of the icon display control executed by the CPU 13 is explained with reference to the flowchart shown in FIG. 3. First, the CPU 13 determines whether a setting condition is complete and photographing conditions are ready (step S101).

When it is confirmed that the photographing is possible (YES at step S101), the CPU 13 determines whether the user has changed a setting condition (step S102). This processing is obtained as a result of checking a memory area for storing the user setting. When there is a changed setting of condition, the changed setting condition is stored in the memory area.

When there is no setting condition that is changed by the user operation (NO at step S102), it is not necessary to determine a user setting (there is no enlarged display of icons), and the operation ends.

On the other hand, when there is a setting condition that is changed by the user operation (YES at step S102), the CPU 13 specifies the changed setting condition, assigns icons corresponding to the specified setting condition as icons to be displayed in a large size, and transmits an on-screen display command to the on-screen-display controller 22, thereby starting the enlarged display of the target icons (step S103). According to the present embodiment, the enlarged display of the icons is carried out for a predetermined time. In order to carry out this time control, a timer is turned on to count the predetermined time.

According to the present embodiment, after the user confirms the setting of the changed setting condition by looking at the enlarged display of the icons on the screen, the user can instruct to end the enlarged display of the icons, because the enlarged display of the icons hinders the operator from determining the image construction of the object. Therefore, the CPU 13 determines whether the user has confirmed the setting (step S104).

When the user has confirmed the setting (YES at step S104), the on-screen-display controller ends the enlarged display of the icons (step S106). The timer that counts the predetermined time is set off, and the operation ends.

When there is no user operation of confirming the changed setting condition by looking at the enlarged display of the icons on the screen at step S104 (NO at step S104), the CPU 13 determines whether the predetermined time of displaying the enlarged icons has passed based on the timer which is turned on in advance (step S105). When the predetermined time has not passed, the process returns to step S104 of determining whether the user has confirmed the setting.

When the predetermined time has passed (YES at step S105), the on-screen-display controller ends the enlarged display of the icons (step S106). The timer that counts the predetermined time is set off, and the operation ends.

Figure 4:
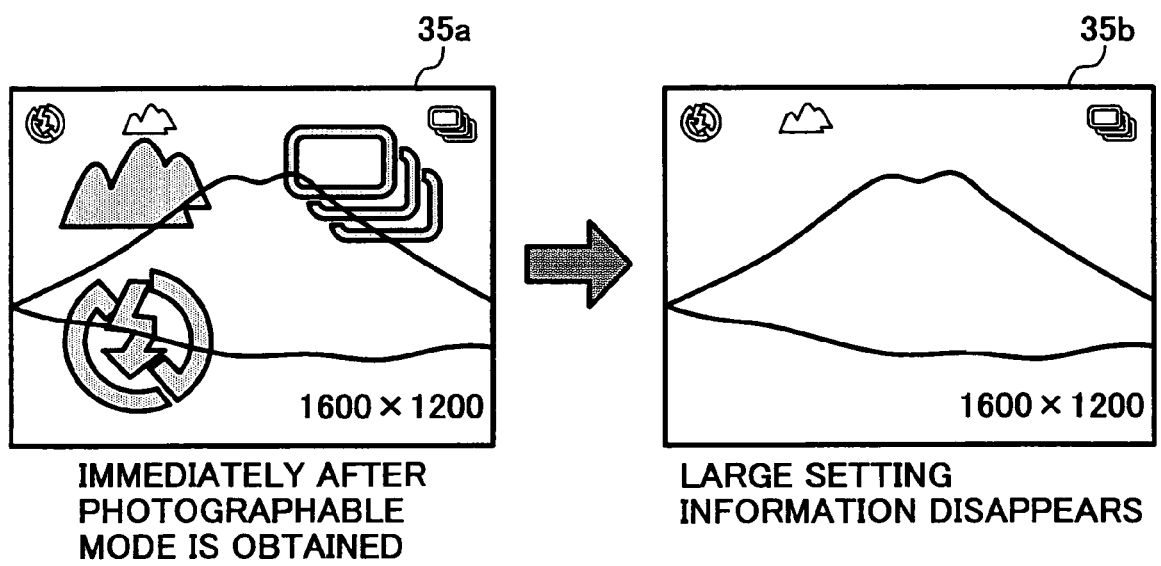
FIG. 4 is a schematic for illustrating the LCD in which a display changes to a normal display after icons are enlarged based on the OSD function of the digital camera, according to the present embodiment.

FIG. 4 is a schematic for illustrating the LCD 10 in which the display changes to a normal display after the icons are enlarged based on the OSD function of the digital camera, according to the present embodiment.

An embodiment of icon display operation on the screen after the enlarged display of the icons ends is explained next. At the end of the enlarged display of the icons, the enlarged display can simply end in the manner as shown by the screen 35*a* changing to the screen 35*b* show in FIG. 4. In the following embodiment, the user can confirm, at a high recognition rate, the setting condition that is changed by the user operation. According to the present embodiment, the size of the enlarged target icons is gradually decreased, and the icons are shifted to predetermined positions when the size of the icons is returned to the normal display size.

Figure 5:
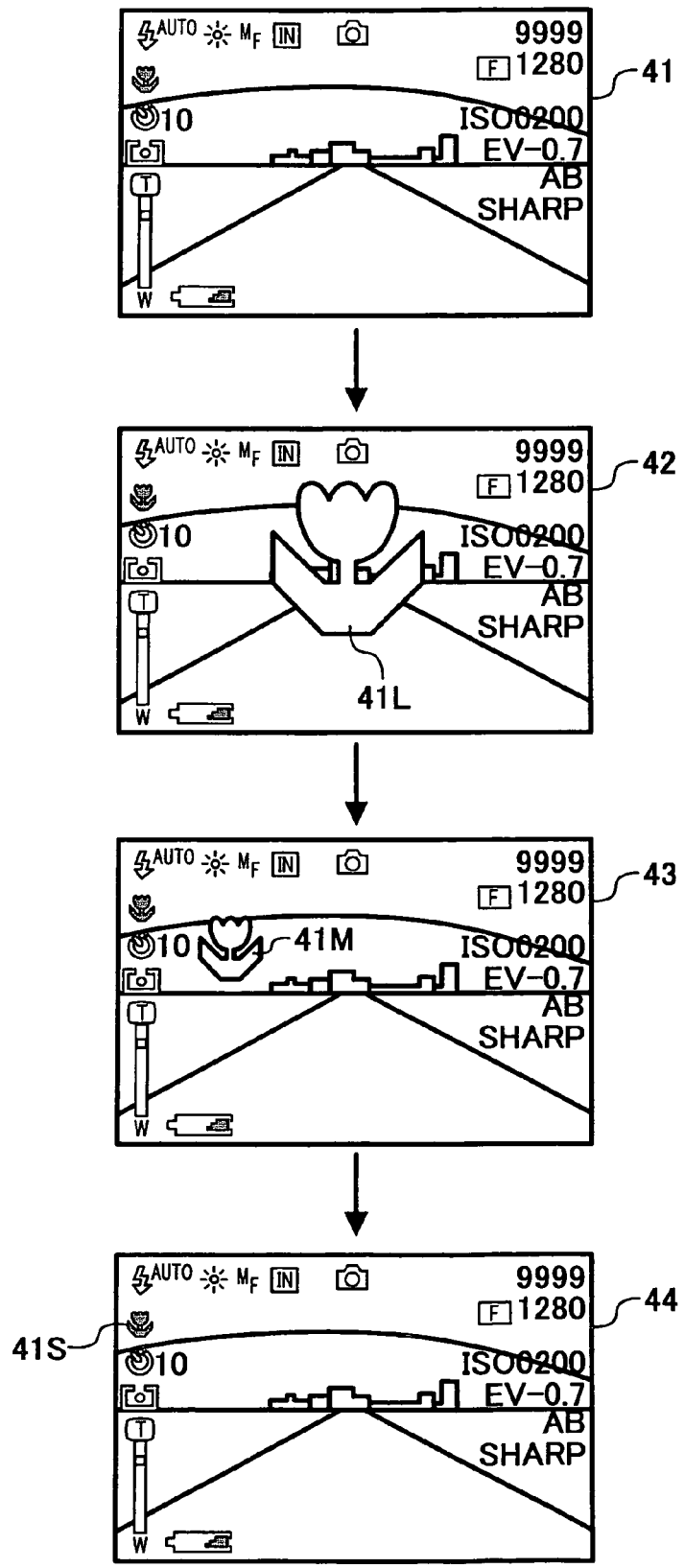
FIG. 5 is a schematic for illustrating a change in the display of an enlarged icon on the screen.

FIG. 5 is a schematic for illustrating a change in the display of an enlarged icon on the screen. In FIG. 5, an example of an icon of a "tulip flower" is displayed in an enlarged size, when the user sets a close-up mode function in photographing by depressing a "close-up mode" button schematically indicated by a tulip flower in a photographing mode (not shown). A screen 41 shown in FIG. 5 shows a state of the screen before the user carries out the setting operation. A screen 42 shows a state that a "tulip flower" icon 41L is displayed in the enlarged size after the user sets the close-up mode.

At the end of the enlarged display, the size of the enlarged display of the "tulip flower" icon 41L shown on the screen 42 shown in FIG. 5 is decreased in size to that of a "tulip flower" icon 41M shown on a screen 43 shown in FIG. 5. Finally, the tulip flower icon is displayed in the normal small size as shown by a "tulip flower" icon 41S at a predetermined position on a screen 44 shown in FIG. 5. As explained, the display size of the icon is gradually decreased as shown on the screen 42 to the screen 44. Based on this display method, the user can recognize, at an improved recognition rate, the setting of the operation mode (function) and the like indicated by the enlarged display of the icon in relation to the layout of the object. Further, a setting error in the photographing condition by the user can be decreased.

As described above, the digital camera has a function of making an enlarged display of icons that indicate the operation mode (function) and the like changed by the user setting. Next, an embodiment in which the user sets the utilization of this function in advance, and uses this setting, is explained.

According to the present embodiment, based on the user setting, the user can select whether to carry out an enlarged display of icons, and can select an operation mode (function) and the like indicated by the icons when the enlarged display of the icons is selected.

Figure 6:
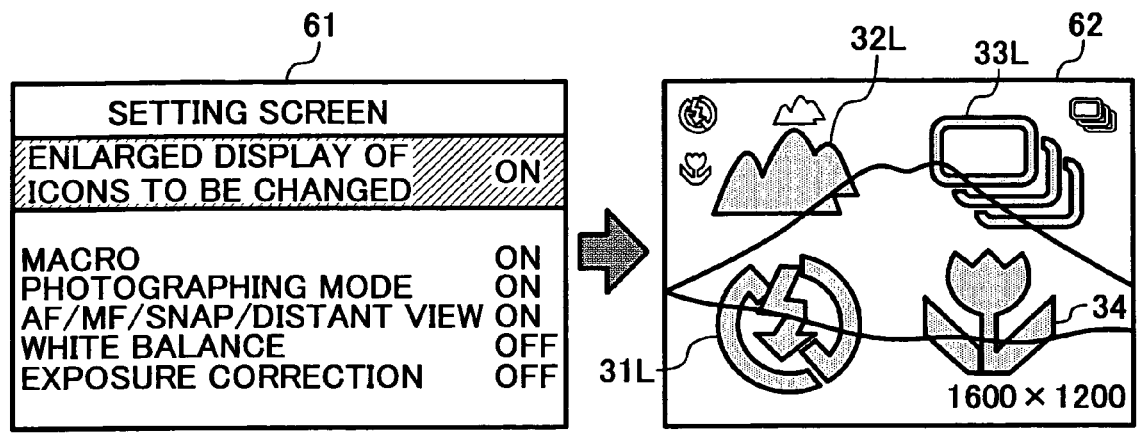
FIG. 6 is a schematic for illustrating a user setting screen when a user uses an icon enlarged-display function, and a display screen following this setting, according to the present embodiment.

FIG. 6 is a schematic for illustrating a user setting screen 61 when the user uses an icon enlarged-display function, and a display screen 62 following this setting, according to the present embodiment. As shown on the screen 61, the user can instruct the setting of each item by inputting ON or OFF to each item. When the user inputs OFF to the item "enlarged display of icons corresponding to a changed setting", this means that the user sets the non-utilization of the enlarged display function. To utilize this function, the user inputs ON to this item. When the user inputs ON to the item "enlarged display of icons corresponding to a changed setting", the user inputs ON or OFF to each of the following items "macro", "photographing mode", "AF/MF/SNAP/distant view", "white balance", and "exposure correction". The camera does not carry out an enlarged display of unnecessary items to which the user inputs OFF.

In the example shown in FIG. 6, the user inputs ON to each of "macro", "photographing mode", and "AF/MF/SNAP/distant view". Therefore, four icons on the screen 61 shown in FIG. 6, i.e., a mountain icon (distant view) 32L, a serial shot icon (a photographing mode) 33L, a flash prohibition icon (a photographing mode) 31L, and a flower icon (macro) 34L, indicate that these icons can be displayed in a large size. In this way, the camera operates to meet user's requests.

While the icons are displayed on the LCD 10 in the above explanation, the icons can be also displayed on an electronic view finder (EVF). In the above explanation, the EVF (not shown) can be used in place of the LCD 10.

Figure 7:
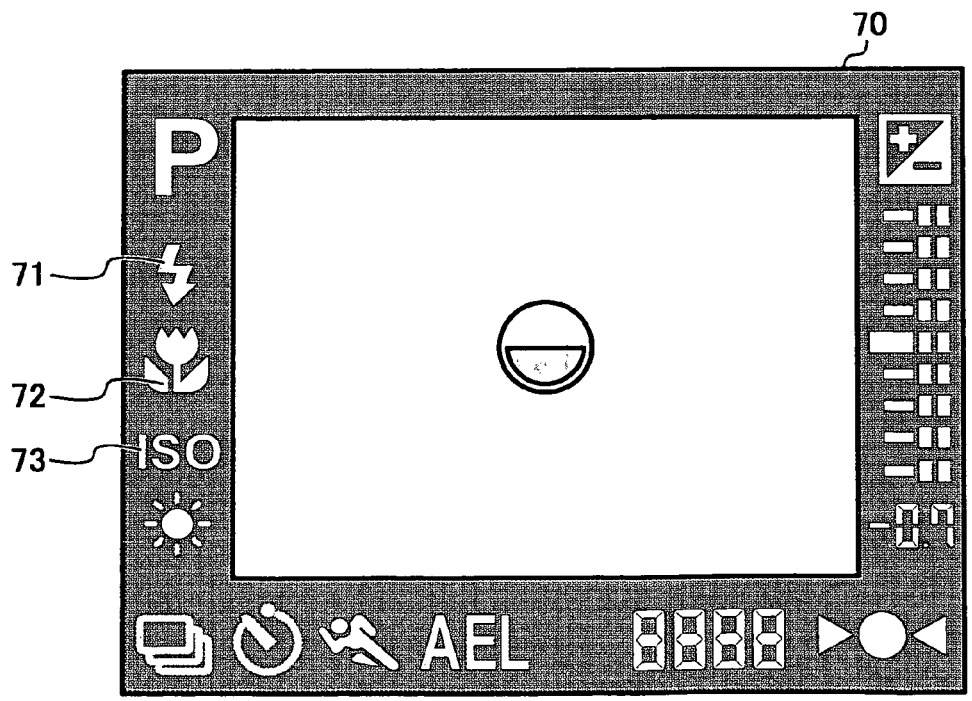
FIG. 7 is a schematic for illustrating a display within an optical finder when the OSD function according to the present invention is applied to an optical finder of a single-lens reflex camera.

FIG. 7 is a schematic for illustrating a display within an optical finder when the OSD function according to the present invention is applied to the optical finder of a single-lens reflex camera. Icons are displayed in the display unit disposed within the optical finder, in place of the LCD 10. In a frame 70 displayed within the optical finder, icons of a flash 71, a close-up mode 72, and ISO (International Standardization Organization) sensitivity 73 are displayed. When the operator sets these icons, the icons are lighted to emphasize the setting change.

The icon display unit 70 of the optical finder can be applied to not only a digital camera but also to an icon display unit of the optical finder in a general camera using a silver salt film.

Figure 8A:
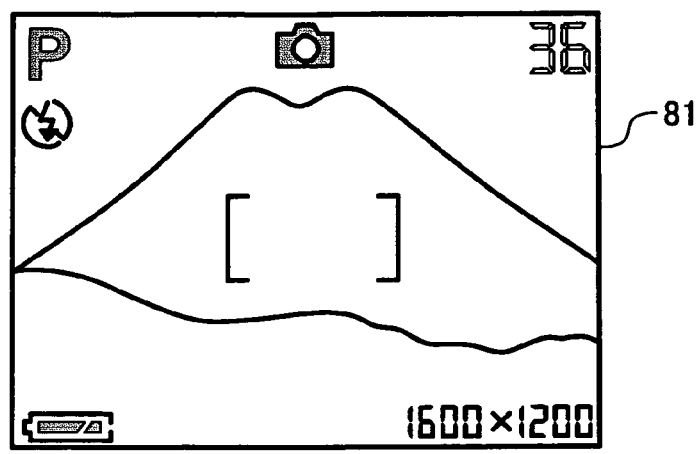
FIGS. 8A and 8B are schematics for illustrating an example of an icon displayed in a different size when a function is changed from a default setting.
Figure 8A:
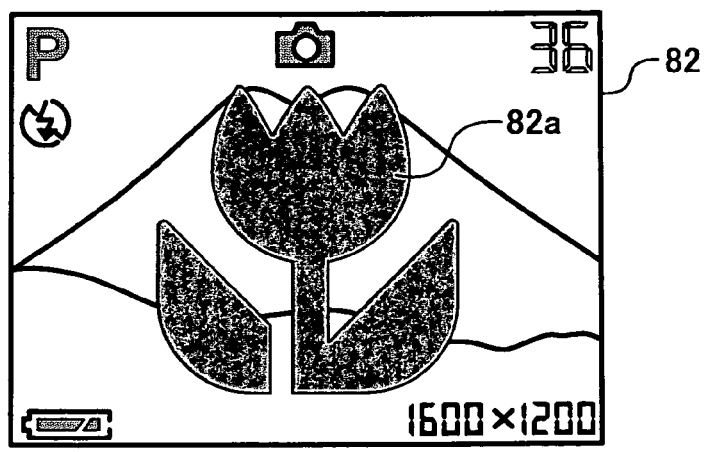
Figure 8A:
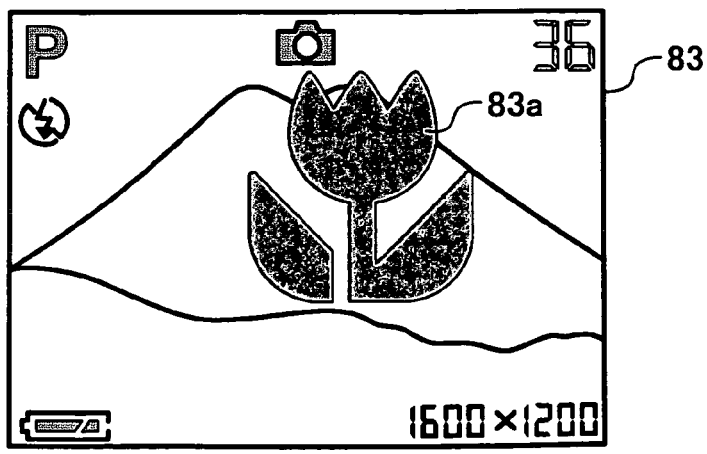
Figure 8B:
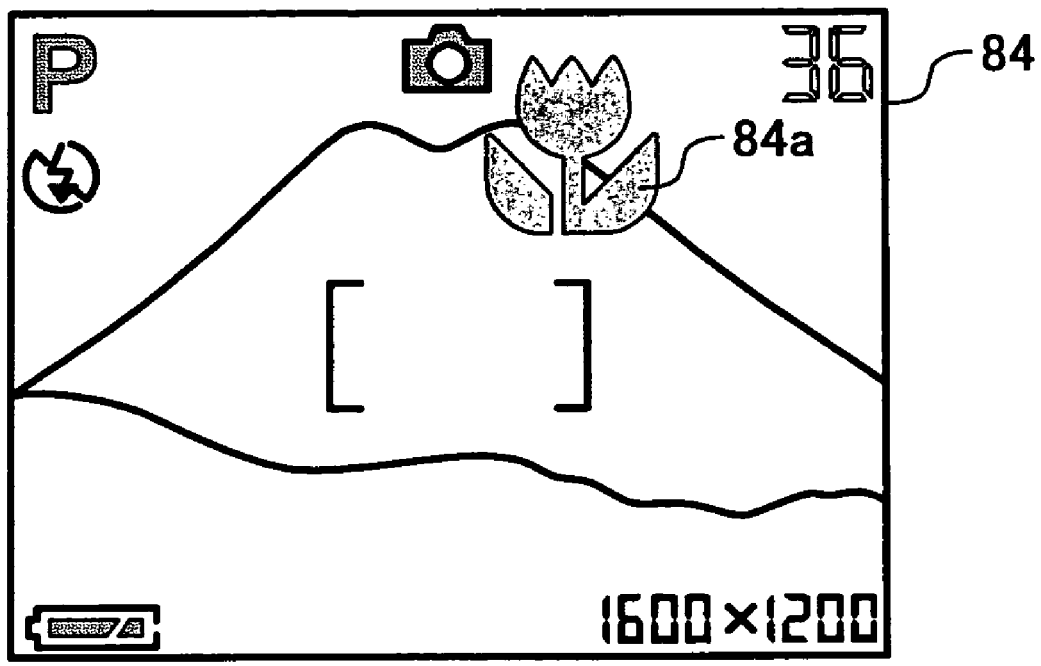
Figure 8B:
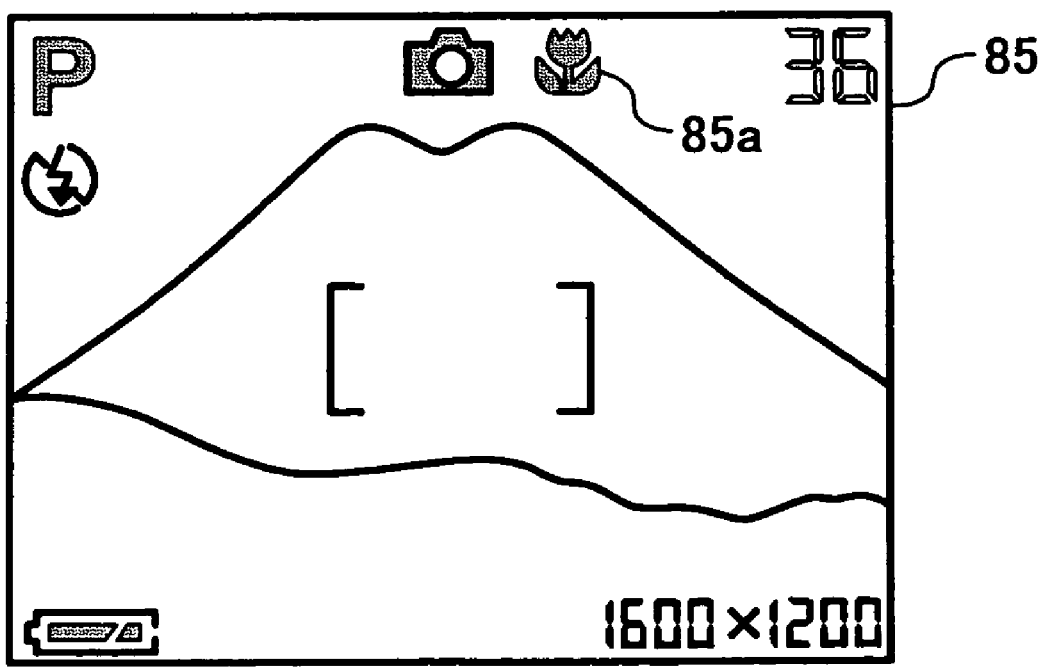

FIGS. 8A and 8B are schematics for illustrating an example of an icon displayed in a different size when a function is changed from a default setting. A screen 81 is a normal display screen. When a close-up mode is set, an icon 82*a* indicating the close-up mode is displayed in an enlarged size at the beginning on a screen 82. When time passes, the size of this icon changes to a smaller size like those of icons 83*a* to 85*a* shown on screens 83 to 85, and the icon is finally disposed at a predetermined position. As explained above, the icon is displayed in a large size immediately after the setting is changed. The size of the icon becomes gradually smaller, and the small icon is displayed at a predetermined position. With this arrangement, the user can recognize the setting. After a predetermined time, the icon can be placed at a position where the icon does not hinder the photographing.

Figure 9A:
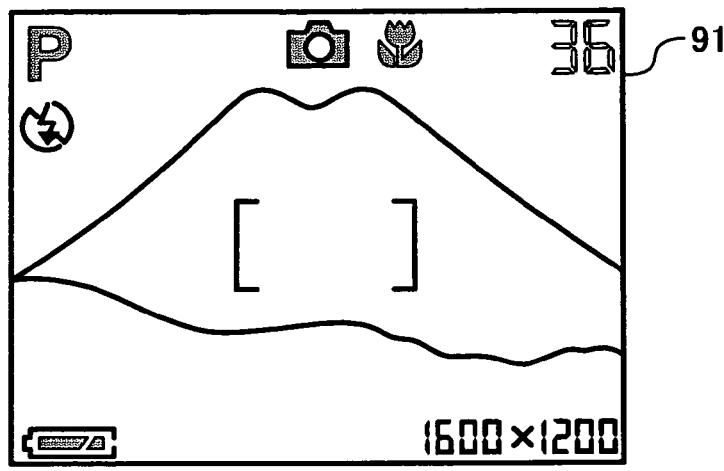
FIGS. 9A to 9C are schematics for illustrating an example of an icon displayed in a different size when a setting of a photographing mode is changed from a close-up mode to a distant-view mode.
Figure 9A:
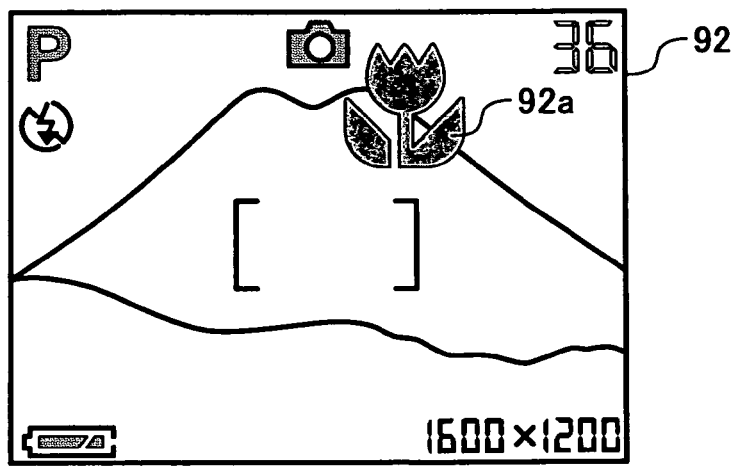
Figure 9A:
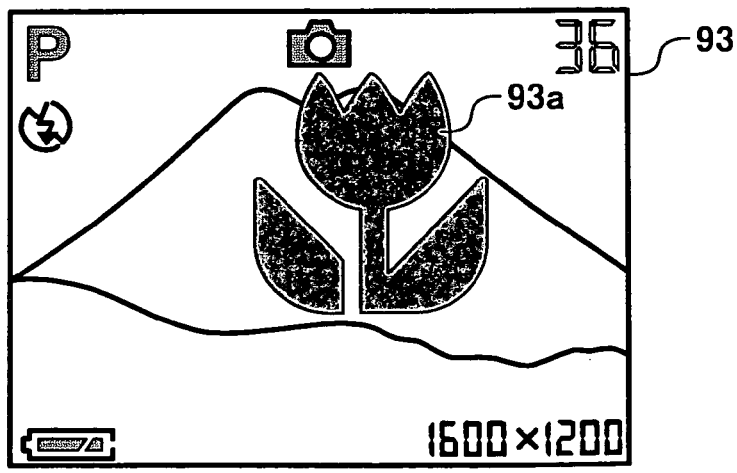
Figure 9B:
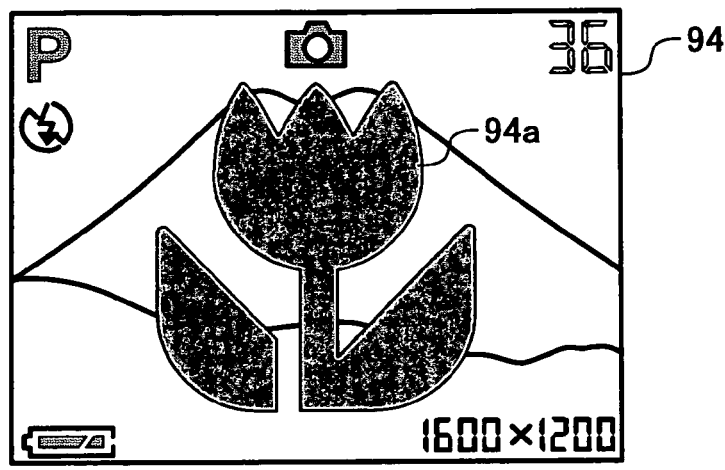
Figure 9B:
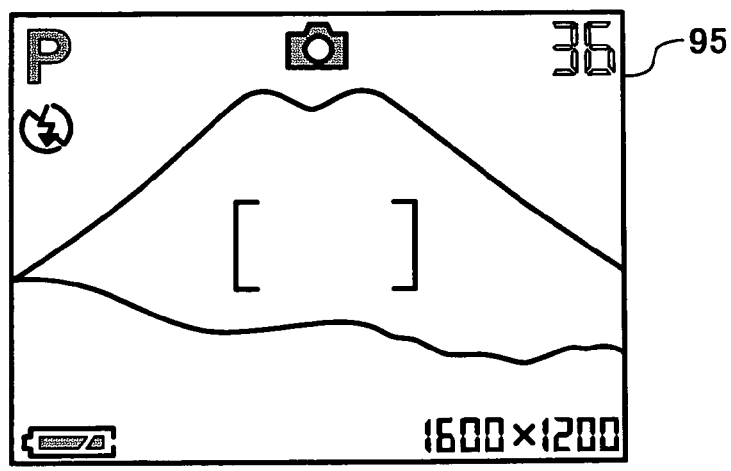
Figure 9B:
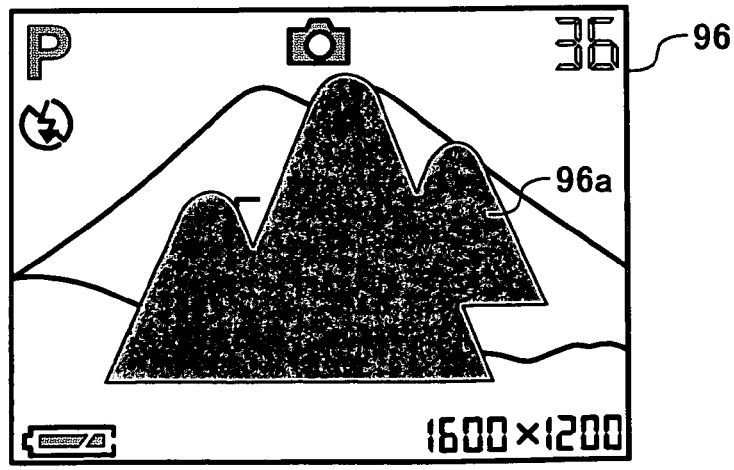
Figure 9C:
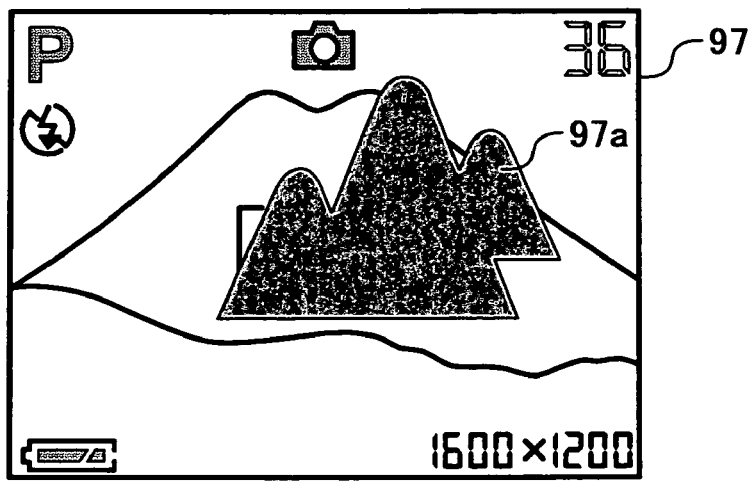
Figure 9C:
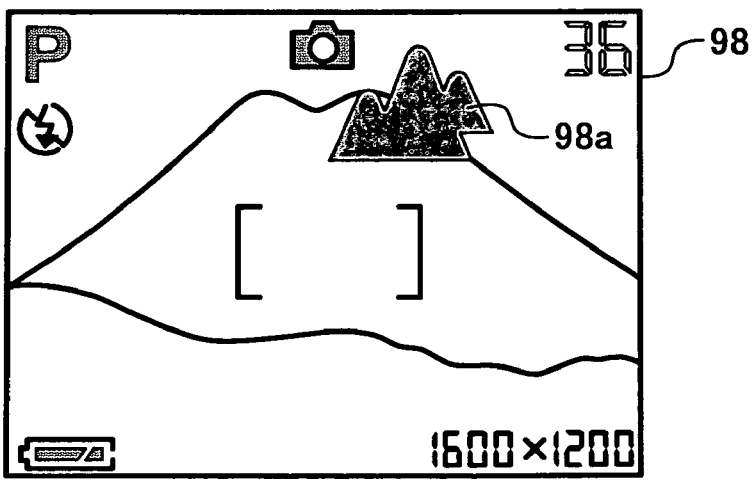
Figure 9C:
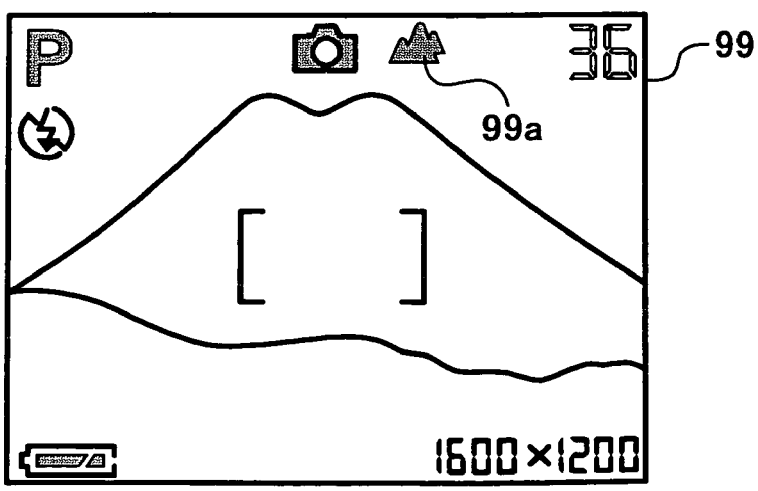

FIGS. 9A to 9C are schematics for illustrating an example of an icon displayed in a different size when a setting of a photographing mode is changed from a close-up mode to a distant-view mode. A screen 91 is a normal display screen with the close-up mode being set. When the distant-view mode is set, an icon indicating the distant-view mode so far being set is displayed in a small size at the beginning on a screen 92. When time passes, the size of this icon changes to a larger size like those of icons 92*a* to 94*a* shown on screens 92 to 94, and the icon finally disappears as shown on a screen 95. In this case, the icon can be displayed in a low thickness while being enlarged, and can disappear is such a way that the icon fades out. This gives an impression to the user that the close-up mode disappears.

Then, an icon 96*a* that indicates the distant-view mode is displayed on a screen 96, and this icon gradually becomes smaller like distant-view mode icons 97*a* to 99*a* shown on screens 97 to 99. As explained above, the icon is displayed in a large size immediately after the setting is changed. The size of the icon becomes gradually smaller. With this arrangement, the user can recognize that the distant-view mode is set this time. The close-up mode and the distant-view mode can be switched over from each other by dynamically changing the size of the switched display, thereby giving an impression of the switchover.

Figure 10A:
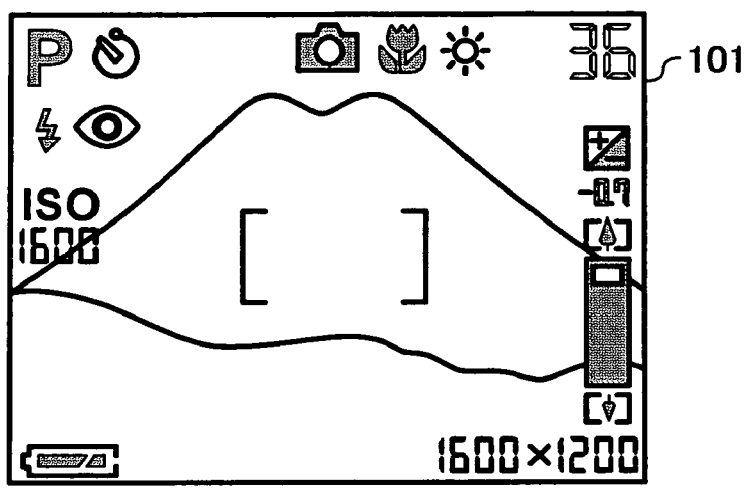
FIGS. 10A and 10B are schematics for illustrating a change of a screen from a change state set to a default setting.
Figure 10A:
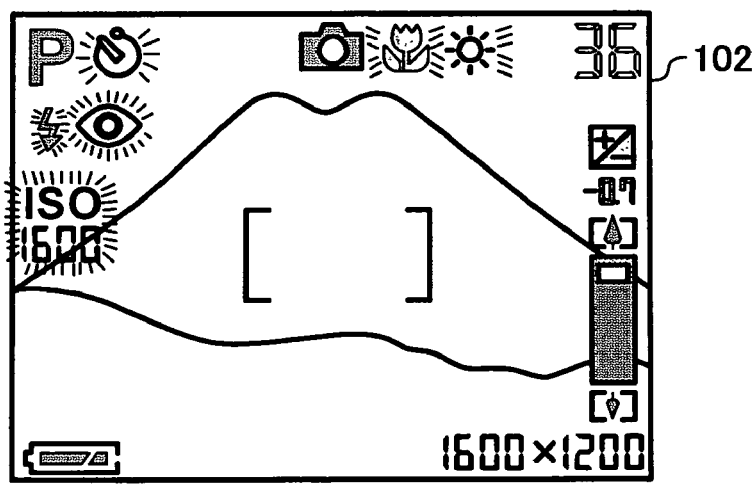
Figure 10A:
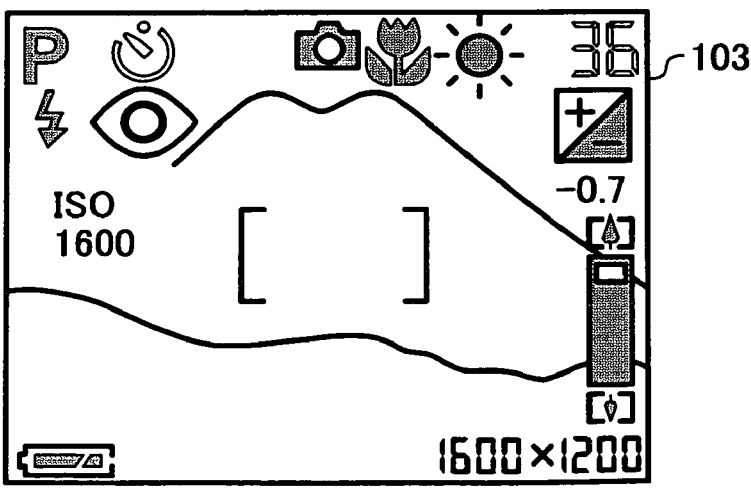
Figure 10B:
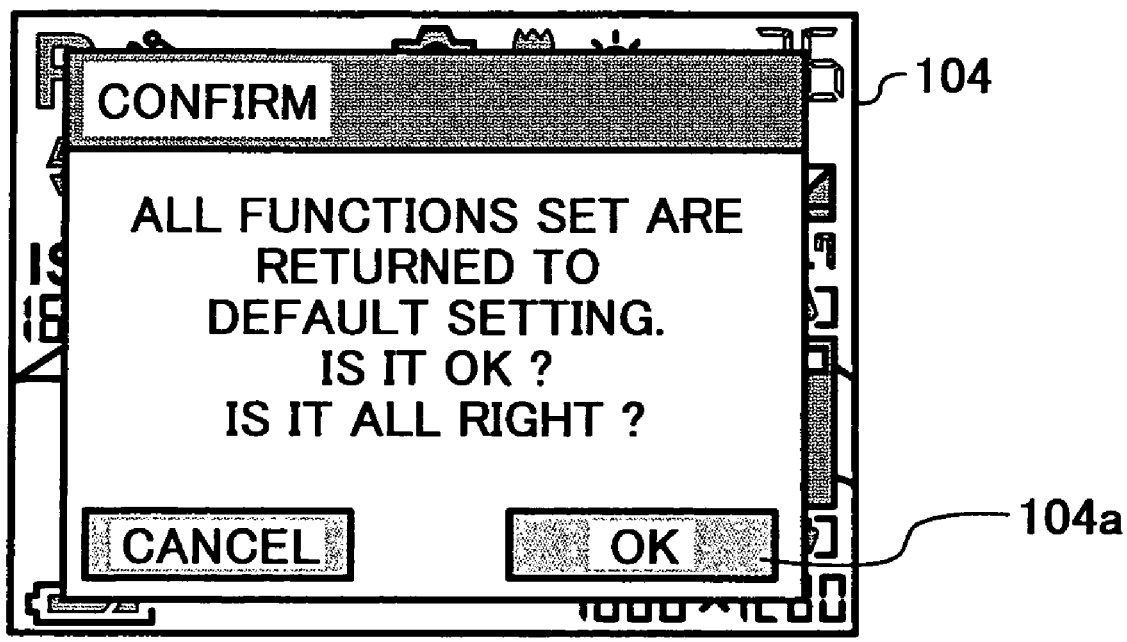
Figure 10B:
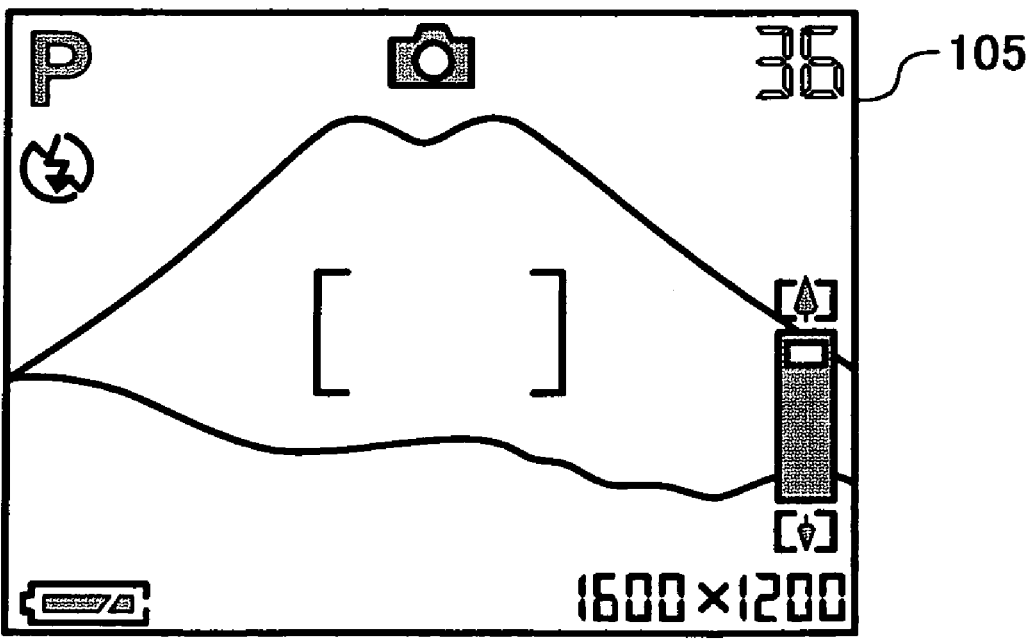

FIGS. 10A and 10B are schematics for illustrating a change of a screen from a change state set to a default setting. In the state that a set normal screen 101 is displayed, when the user depresses the setting change button (not shown) in the operating unit 14 that accepts the user input, the set icons flicker on a screen 102. Alternatively, the set icons can be switched to an enlarged display shown on a screen 103. When the user stops depressing the setting-change button, the original screen 101 is obtained.

When the user continues depressing the setting-change button, a screen 104 for accepting the switchover to the default setting is displayed. When the user depresses an OK button (not shown) in the operating unit 14 by moving a cursor to an OK display 104*a* on the screen 104, the setting by the operator is all canceled, and the original default setting is obtained. A screen 105 shows the returned default setting.

FIG. 11 is a schematic for illustrating an example of a display of icons when photographing conditions are set differently from default conditions. A screen 111 shows both icons and character information by comparing the default setting with the set current state. A screen 112 has an area in which a display bar 112*a* is provided. Only an icon 112*b* of which setting is different from the default setting is displayed in this area. On a screen 113, an underline is provided to the icon of which setting is different from the default setting, thereby emphasizing this icon. Both the screen 112 and the screen 113 give display to emphasize the icon of which setting is changed from the default setting, thereby enabling the operator to easily recognize the change of the setting.

As explained above, according to the present invention, the CPU 13 reads the OSD control program stored in the ROM 23 to retrieve the information-processing method of controlling the digital camera having a display unit that can display icons indicating the device state or the operating condition of the digital camera according to the OSD function. Based on the device condition determining function stored in the program, the change in the sate of the digital camera or the change in the setting of the operating condition is determined. Based on the function of assigning the icons, icons that indicate the state or the operating condition of the digital camera of which change is determined is assigned. Based on the OSD display control function, the icons assigned are OSD displayed in a state different from that of the icons before the icons are assigned.

When the settings of the digital camera for photographing are changed from the default setting or from the state immediately before the change of the setting, the icons are displayed in a state different from that before the settings are changed. With this arrangement, the user's visibility of confirming the changed setting improves. Further, the user can correctly determine the setting, thereby decreasing photographing errors attributable to erroneous setting by the user.

Furthermore, according to the present invention, user's visibility of confirming the setting change improves, and a user can correctly determine the setting.

Moreover, according to the present invention, user's visibility of confirming the setting change improves. Since the icons are displayed in the normal mode during a normal use, the user can correctly determine the setting, thus the icons do not hinder the display during the normal use.

Furthermore, according to the present invention, when an operator changes a setting, visibility of confirming the setting change improves, and the operator can correctly determine the setting.

Moreover, according to the present invention, when an operator operates the electronic apparatus, user's visibility of confirming a setting change improves, and the operator can correctly determine the setting.

Furthermore, according to the present invention, when an operator turns on the electronic apparatus, visibility of confirming the setting change improves. After the setting change is confirmed, the icons are returned to the normal icons. Therefore, user's visibility of the normal display of the display unit is not hindered.

Moreover, according to the present invention, normal visibility is not hindered during a general use of the camera, and user's visibility of confirming the icons corresponding to the setting change improves.

Furthermore, according to the present invention, it is possible to prevent confusion due to a false recognition or an operation error.

Moreover, according to the present invention, a user can recognize a kind of a setting condition in relation to a layout, thereby improving a recognition rate and decreasing an erroneous setting.

Furthermore, according to the present invention, a user can determine a setting or instruct a start of the device while being conscious about presence of a base image. Therefore, the user can determine an appropriate setting and instruct the starting correctly.

Moreover, according to the present invention, it is possible to provide an information-processing method for controlling an electronic apparatus with a display unit that improves user's visibility of confirming the setting change, and enables a user to correctly determine the setting.

Furthermore, according to the present invention, a computer can execute the information-processing method according to the invention.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

As described above, the electric apparatus with the display, the method of processing information, and the program causing the computer to execute the method according to the present invention, is useful for a display technology used in the electric apparatus with the display. Particularly, the present invention is useful for the display technology used in an electric apparatus with a display such as a photographing apparatus (e.g. a digital camera), a PDA (Personal Digital Assistants), or a cellular phone with a small display which may display an icon indicating a state and an operating condition of an apparatus by using the OSD (On Screen Display) function.

What is claimed is:

1. A photographing unit configured to perform a photographing operation of capturing image data of an object when an instruction for capturing the image data of the object is input, the photographing unit comprising:
   a display unit configured to display on a display at least one of a plurality of icons including a first icon indicating a first camera function and a second icon indicating a second camera function; and
   a display controller configured to display the first icon at a predetermined position of the display when a camera function of the photographing unit is set to the first camera function, wherein
   the display controller is further configured to cause the second icon to appear on the display in a large size and to cause the second icon to appear on the display in a reduced size subsequent to the second icon appearing on the display in the large size, when the camera function is set to the second camera function from the first camera function.

2. The photographing unit according to claim 1, further comprising an operating unit configured to set the camera function of the photographing unit to the second camera function from the first camera function.

3. The photographing unit according to claim 2, wherein
   the display controller is configured to cause the first icon to disappear from the predetermined position of the display, when the camera function is set to the second camera function from the first camera function, and
   the photographing unit is readied for the photographing operation when the instruction for capturing the image data of the object is input while the second icon in the large size is displayed on the display.

4. The photographing unit according to claim 3, wherein
   the photographing unit includes a focusing mechanism, and
   the display controller is further configured to display one of the first icon in a large size and the second icon in the large size on the display when the focusing mechanism determines that the object is in focus, the first icon in the large size displayed when the camera function is set to the first camera function and the second icon in the large size displayed when the camera function is set to the second camera function.

5. The photographing unit according to claim 4, wherein the photographing unit includes one of a camera, a portable phone, and a personal digital assistant device.

6. The photographing unit according to claim 3, wherein the display controller is further configured to display the second icon in the reduced size at the predetermined position of the display in place of the first icon.

7. The photographing unit according to claim 6, wherein the display controller is further configured to gradually decrease a size of the second icon from the large size to the reduced size.

8. The photographing unit according to claim 7, wherein the display controller is further configured to display the second icon in the large size in a center portion of the display, and the second icon in the reduced size in a peripheral portion of the display.

9. The photographing unit according to claim 1, wherein the display controller is further configured to display one of the first icon in a large size and the second icon in the large size on the display when the photographing unit is turned on or after a predetermined time period from turning on the photographing unit, the first icon in the large size displayed when the camera function is set to the first camera function and the second icon in the large size displayed when the camera function is set to the second camera function.

10. A method of controlling a photographing unit configured to perform a photographing operation of capturing image data of an object when an instruction for capturing the image data of the object is input, the photographing unit provided with a display unit having a display, the method comprising:
    displaying a first icon indicating a first camera function at a predetermined position of the display when a camera function of the photographing unit is set to the condition camera function; and
    displaying a second icon indicating a second camera function in a large size and subsequently in a reduced size, while causing the first icon to disappear from the predetermined position of the display, when the camera function is set to the second camera function from the first camera function.

11. The method according to claim 10, further comprising:
    setting the camera function of the photographing unit to the second camera function from the first camera function;
    determining whether the instruction for capturing image data of the object is input to the photographing unit while the second icon in the large size is displayed on the display; and
    readying the photographing unit for the photographing operation of capturing the image data of the object when the determining determines that the instruction is input.

12. The method according to claim 11, wherein the second icon in the reduced size is displayed at the predetermined position of the display in place of the first icon.

13. The method according to claim 12, the displaying the second icon further comprising gradually decreasing a size of the second icon from the large size to the reduced size.

14. The method according to claim 13, wherein the second icon in the large size is displayed in a center portion of the display, and the second icon in the reduced size is displayed in a peripheral portion of the display.

15. The method according to claim 14, further comprising:
    performing the photographing operation of capturing the image data of the object, and determining when the object is in focus; and
    displaying one of the first icon in a large size and the second icon in the large size on the display when the object is determined to be in focus during the performing, the first icon in the large size displayed when the camera function is set to the first camera function and the second icon in the large size displayed when the camera function is set to the second camera function.

16. The method according to claim 14, further comprising displaying one of the first icon in a large size and the second icon in the large size on the display when the photographing unit is turned on or after a predetermined time period from turning on the photographing unit, the first icon in the large size displayed when the camera function is set to the first camera function and the second icon in the large size displayed when the camera function is set to the second camera function.

17. The method according to claim 15, wherein the photographing unit includes one of a camera, a portable phone, and a personal digital assistant device.

18. A computer-readable recording medium including computer program instructions which cause a computer to execute a method of controlling a photographing unit configured to perform a photographing operation of capturing image data of an object when an instruction for capturing the image data of the object is input, the photographing unit provided with a display unit having a display, the method comprising:

displaying a first icon indicating a first camera function at a predetermined position of the display when a camera function of the photographing unit is set to the first camera function; and displaying a second icon indicating a second camera function in a large size and subsequently in a reduced size, while causing the first icon to disappear from the predetermined position of the display, when the camera function is set to the second camera function from the first camera function.

19. The medium according to claim 18, the method further comprising:

setting the camera function of the photographing unit to the second camera function from the first camera function;

determining whether the instruction for capturing image data of the object is input to the photographing unit while the second icon in the large size is displayed on the display; and readying the photographing unit for the photographing operation of capturing the image data of the object when the determining determines that the instruction is input.

20. The medium according to claim 19, wherein the second icon in the reduced size is displayed at the predetermined position of the display in place of the first icon.

21. The medium according to claim 20, the displaying the second icon further comprising gradually decreasing a size of the second icon from the large size to the reduced size.

22. The medium according to claim 21, wherein the second icon in the large size is displayed in a center portion of the display, and the second icon in the reduced size is displayed in a peripheral portion of the display.

23. The medium according to claim 22, the method further comprising:

performing the photographing operation of capturing the image data of the object, and determining when the object is in focus; and displaying one of the first icon in a large size and the second icon in the large size on the display when the object is determined to be in focus during the performing, the first icon in the large size displayed when the camera function is set to the first camera function and the second icon in the large size displayed when the camera function is set to the second camera function.

24. The medium according to claim 22, the method further comprising displaying one of the first icon in a large size and the second icon in the large size on the display when the photographing unit is turned on or after a predetermined time period from turning on the photographing unit, the first icon in the large size displayed when the camera function is set to the first camera function and the second icon in the large size displayed when the camera function is set to the second camera function.

* * * * *